United States Patent
Hakomori (10) Patent No.: US 8,150,258 B2
(45) Date of Patent: Apr. 3, 2012

(54) OPTICAL TRANSMISSION DEVICE AND OPTICAL TRANSMISSION METHOD

(75) Inventor: Katsuhiko Hakomori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 12/343,480

(22) Filed: Dec. 24, 2008

(65) Prior Publication Data

US 2009/0169203 A1    Jul. 2, 2009

(30) Foreign Application Priority Data

Dec. 26, 2007 (JP) ................................. 2007-334972

(51) Int. Cl.
H04B 10/08  (2006.01)

(52) U.S. Cl. .............. 398/17; 398/21; 398/25; 398/159; 398/162

(58) Field of Classification Search .................... 398/17, 398/21, 20, 23, 28, 26, 27, 36, 159, 162
See application file for complete search history.

(56) References Cited

U.S. PATENT DOCUMENTS

| | | | | |
|---|---|---|---|---|
| 5,767,956 A | * | 6/1998 | Yoshida | 356/73.1 |
| 5,900,959 A | * | 5/1999 | Noda et al. | 398/195 |
| 6,469,824 B2 | * | 10/2002 | Sasaki | 359/341.44 |
| 7,260,324 B2 | * | 8/2007 | Passier et al. | 398/17 |
| 7,319,816 B2 | * | 1/2008 | Satou et al. | 398/21 |
| 7,324,189 B2 | * | 1/2008 | Ohtani | 356/73.1 |
| 7,355,945 B2 | * | 4/2008 | Shimada et al. | 369/53.19 |
| 7,408,146 B2 | * | 8/2008 | Yano | 250/227.11 |
| 7,864,411 B2 | * | 1/2011 | Mino | 359/341.41 |
| 2004/0190897 A1 | | 9/2004 | Satou et al. | |
| 2006/0017803 A1 | * | 1/2006 | Kuwahara et al. | 347/251 |
| 2006/0219878 A1 | | 10/2006 | Yano | |
| 2007/0139774 A1 | * | 6/2007 | Ohtani | 359/515 |
| 2008/0285661 A1 | * | 11/2008 | Clements et al. | 375/257 |

FOREIGN PATENT DOCUMENTS

| | | |
|---|---|---|
| JP | 2002-335214 | 11/2002 |
| JP | 2004-304673 | 10/2004 |
| JP | 2005-286629 | 10/2005 |
| JP | 2006-287649 A | 10/2006 |

OTHER PUBLICATIONS

Japanese Office Action mailed Dec. 6, 2011 for corresponding Japanese Application No. 2007-334972, with English-language translation.

* cited by examiner

Primary Examiner — Kenneth N Vanderpuye
Assistant Examiner — Hibret Woldekidan
(74) Attorney, Agent, or Firm — Fujitsu Patent Center (57) ABSTRACT

An optical transmission device for controlling an optical signal output includes a return light detection section for detecting return light of the optical signal transmitted via the optical transmission line; a superimposed light transmission section for generating superimposed light having a superimposed basic low-frequency wave and transmitting the light when return light is detected by the return light detection section; a return light identification section for identifying the return light detected by the return light detection section as Fresnel light caused by a disconnection of the optical connector or Stokes light caused by stimulated Brillouin scattering based on an analysis result of the return superimposed light with respect to the superimposed light transmitted by the superimposed light transmission section.

4 Claims, 9 Drawing Sheets

| (A) | $\sin A \times \sin B = -\frac{1}{2}[\cos(A+B) - \cos(A-B)]$ |
|---|---|
| (B) | $\sin(\omega t + \alpha) \times \sin(\omega t + \beta) = \frac{1}{2}[\cos(\beta - \alpha) - \underbrace{\cos(2\omega t + \alpha + \beta)}_{\text{HIGH-FREQUENCY COMPONENT}}]$ |
| (C) | $\frac{1}{2}\cos(\beta - \alpha)$ |

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2007-334972, filed on Dec. 26, 2007, the entire contents of which are incorporated herein by reference.

BACKGROUND OF THE INVENTION

1. Field of the Invention

The present invention relates to an optical transmission device and an optical transmission method that have a function to control an output of an optical signal and transmit an optical signal via an optical transmission line having an optical fiber connected by an optical connector.

2. Description of the Related Art

Conventionally, in an optical transmission system using an optical transmission technique, a technique for controlling an output of an optical signal has been proposed (for example, see Japanese Unexamined Patent Application Publication No. 2006-287649).

In the known technique, when reflected light on an optical connector end face is detected, it is determined that an optical fiber is disconnected from the optical connector, and the output of the optical signal is reduced to a safe level.

However, in the above-described known technique, in some cases, it is difficult to perform the control operation of the optical transmission system.

In the above-described known technique, the optical output is controlled based on a detection of reflected light from the optical connector end face. However, in the optical transmission system, in addition to the optical connector disconnection, reflected light due to stimulated Brillouin scattering (SBS) may be generated. In such a case, in the known technique, the detection of the reflected light due to SBS is erroneously determined as the optical connector disconnection. Then, the output of the optical signal is reduced to a safe level, and as a result, SBS is not generated.

In the optical transmission system, if the generation of SBS and the optical output level reduction operation are repeatedly operated in such a way, an optical amplifier for amplifying the inputted optical signal intermittently oscillates. As a result, in some cases, the overall control of the optical transmission system is difficult.

The present invention addresses the above-described problem in the known technique. An aspect of the invention is to provide an optical transmission device and an optical transmission method capable of identifying whether reflected light detected in a system is caused by an optical connector disconnection or SBS, and implementing a control operation of the system based on the identification result.

SUMMARY OF THE INVENTION

An optical transmission device for controlling an optical signal output and transmitting an optical signal via an optical transmission line having an optical fiber connected by an optical connector, the optical transmission device comprises a return light detection section for detecting return light of the optical signal transmitted via the optical transmission line; a superimposed light transmission section for generating superimposed light having a superimposed basic low-frequency wave and transmitting the light when return light is detected by the return light detection section; a return light identification section for identifying the return light detected by the return light detection section as Fresnel light caused by a disconnection of the optical connector or Stokes light caused by stimulated Brillouin scattering based on an analysis result of the return superimposed light with respect to the superimposed light transmitted by the superimposed light transmission section.

DESCRIPTION OF THE PREFERRED EMBODIMENTS

Embodiments for implementing an optical transmission device and an optical transmission method according to the present invention will be described in detail with reference to the attached drawings. In the descriptions, as the embodiments for implementing the invention, a first embodiment for implementing an optical transmission device is described. Then, the other embodiments are described as the other embodiments included in the present invention.

First Embodiment

Hereinafter, in the first embodiment, an outline and characteristics of an optical transmission device, a configuration and processings in the optical transmission device are described in the order, and effects according to the first embodiment will be described.

Outline and Characteristics of Optical Transmission Device (First Embodiment)

Figure 1:
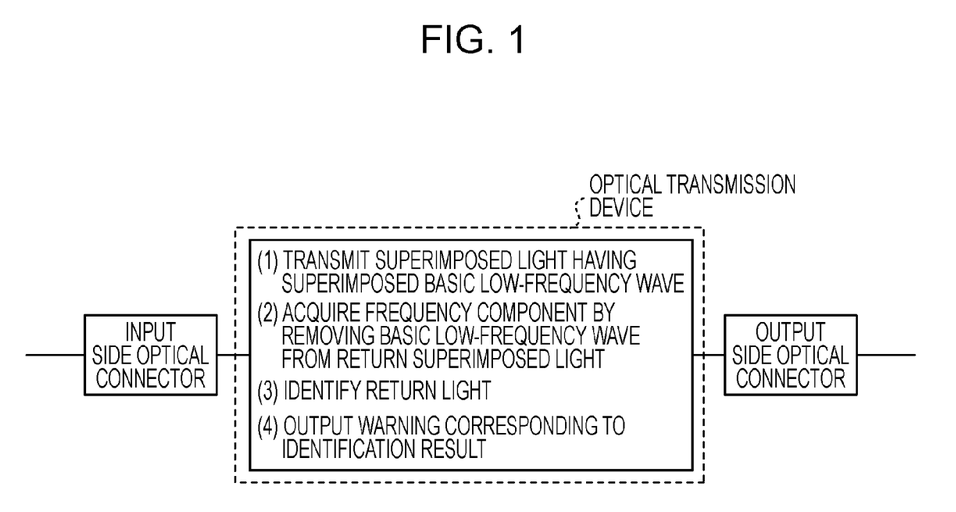
FIG. 1 is a view illustrating an outline and characteristics of an optical transmission device according to a first embodiment of the present invention.
Figure 2A:
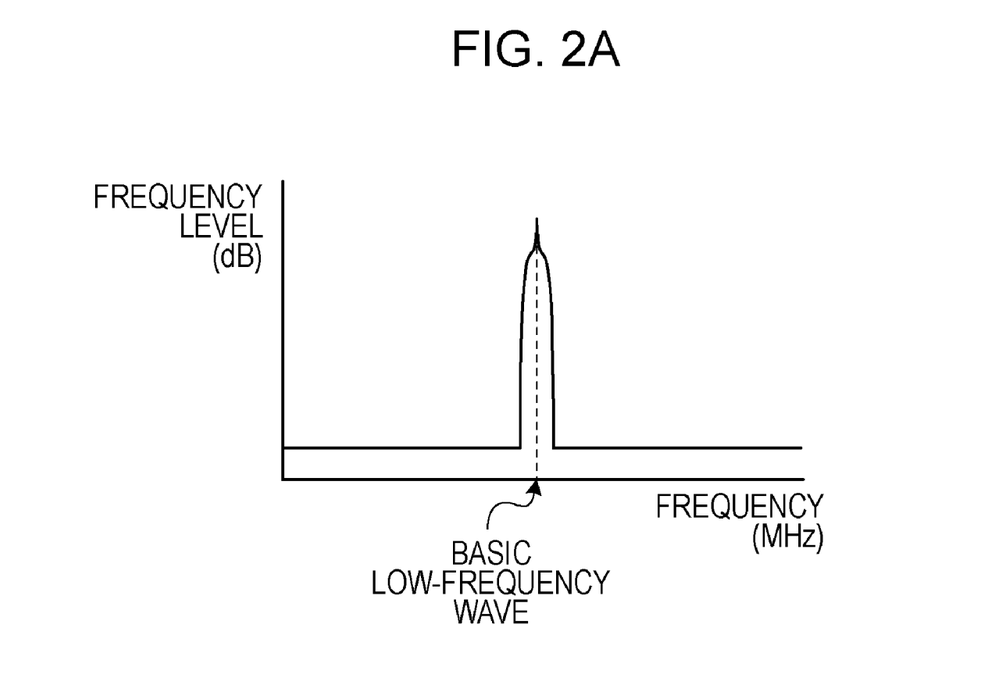
FIGS. 2A and 2B are schematic diagrams illustrating characteristics of Fresnel light according to the first embodiment of the present invention.
Figure 2B:
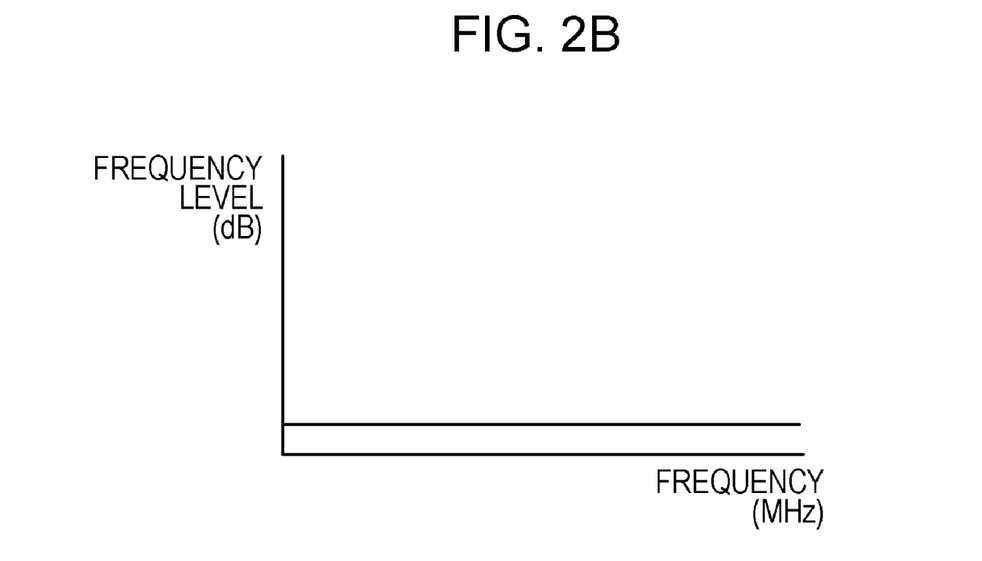
Figure 3A:
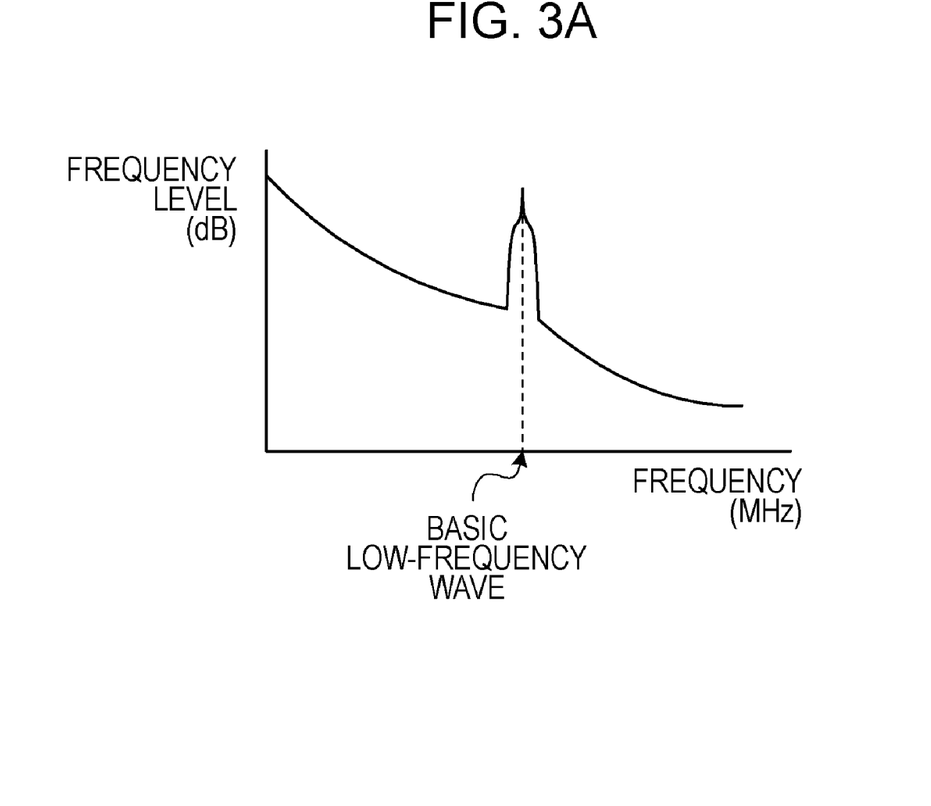
FIGS. 3A and 3B are schematic diagrams illustrating characteristics of Stokes light according to the first embodiment of the present invention.
Figure 3B:
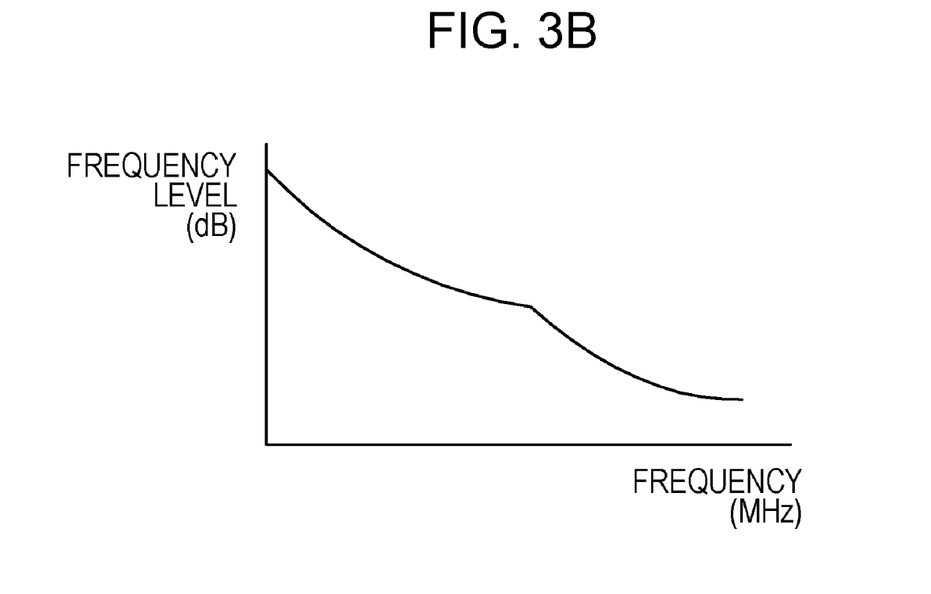

First, with reference to FIGS. 1 to 3, an outline and characteristics of an optical transmission device according to the first embodiment will be described. FIG. 1 is a view illustrating an outline and characteristics of an optical transmission device according to the first embodiment of the present invention. FIGS. 2A and 2B are schematic diagrams illustrating characteristics of Fresnel light caused by a disconnection of an optical connector according to the first embodiment of the present invention. FIGS. 3A and 3B are schematic diagrams illustrating characteristics of Stokes light caused by SBS according to the first embodiment of the present invention.

The optical transmission device according to the first embodiment controls an output of an optical signal and transmits the optical signal via an optical transmission line including an optical fiber connected by an optical connector. A primary characteristic of the optical transmission device according to the first embodiment is that the optical transmission device can identify whether reflected light detected in the system is caused by a disconnection of the optical connector or SBS, and implement a system control operation based on the identification result.

The primary characteristic is specifically described. As illustrated in FIG. 1, the optical transmission device according to the first embodiment, in response to a detection of return light returned from an output side optical connector, generates a superimposed light having a superimposed basic low-frequency wave, and transmits the light from the output side optical connector to the outside ((1) in FIG. 1).

Then, the optical transmission device according to the first embodiment acquires a frequency component at the time the basic low-frequency wave is removed from return superimposed light returned from the output side optical connector ((2) in FIG. 1). Subsequently, the optical transmission device identifies whether the return light returned from the output side optical connector is Fresnel light caused by a disconnection of the optical connector or Stokes light caused by SBS ((3) in FIG. 1).

Now, characteristics of the Fresnel light and the Stokes light at the time the basic low-frequency wave is removed from the returned superimposed light and the frequency component is acquired are briefly described. First, in a case where the return light returned from the output side optical connector is the Fresnel light caused by the disconnection of the optical connector, a relationship between a frequency and a frequency level of the superimposed light generated by superimposing the basic low-frequency wave and the return light becomes a relationship illustrated in FIG. 2A. As illustrated in FIG. 2B, the frequency component obtained by removing the basic low-frequency wave from the return superimposed light returned from the output side optical connector has a characteristic that in each frequency band, the frequency level is low.

On the other hand, in a case where the return light returned from the output side optical connector is the Stokes light caused by SBS, a relationship between a frequency and a frequency level of the superimposed light generated by superimposing the basic low-frequency wave and the return light becomes a relationship illustrated in FIG. 3A. As illustrated in FIG. 3B, the frequency component obtained by removing the basic low-frequency wave from the return superimposed light returned from the output side optical connector has a characteristic that in frequency bands lower than the basic low-frequency wave, frequency levels are high.

As illustrated in FIG. 2B, in the case where a frequency component having a low frequency level in each frequency band is acquired, the optical transmission device according to the first embodiment identifies the return light returned from the output side optical connector as the Fresnel light caused by a disconnection of the optical connector.

As illustrated in FIG. 3B, in the case where the frequency component having a high frequency level in a frequency band lower than the basic low-frequency wave is acquired, the optical transmission device according to the first embodiment integrates the frequency component and detects an amplitude of the frequency. If the amplitude exceeds a threshold, the optical transmission device identifies the return light returned from the output side optical connector as the Stokes light caused by SBS.

In a case where the optical transmission device according to the first embodiment identifies the return light returned from the output side optical connector as the Fresnel light caused by the disconnection of the optical connector, controls to reduce the output of the light to a safe level, and outputs a warning by an alarm or the like to an administrator in a state the identification result of the return light can be distinguished ((4) in FIG. 1).

As described above, the optical transmission device according to the first embodiment can identify the reflected light detected in the system as light caused by a disconnection of the optical connector or SBS, and implement the operation to control the system based on the identification result.

Configuration and Processing in Optical Transmission Device (First Embodiment)

Figure 4:
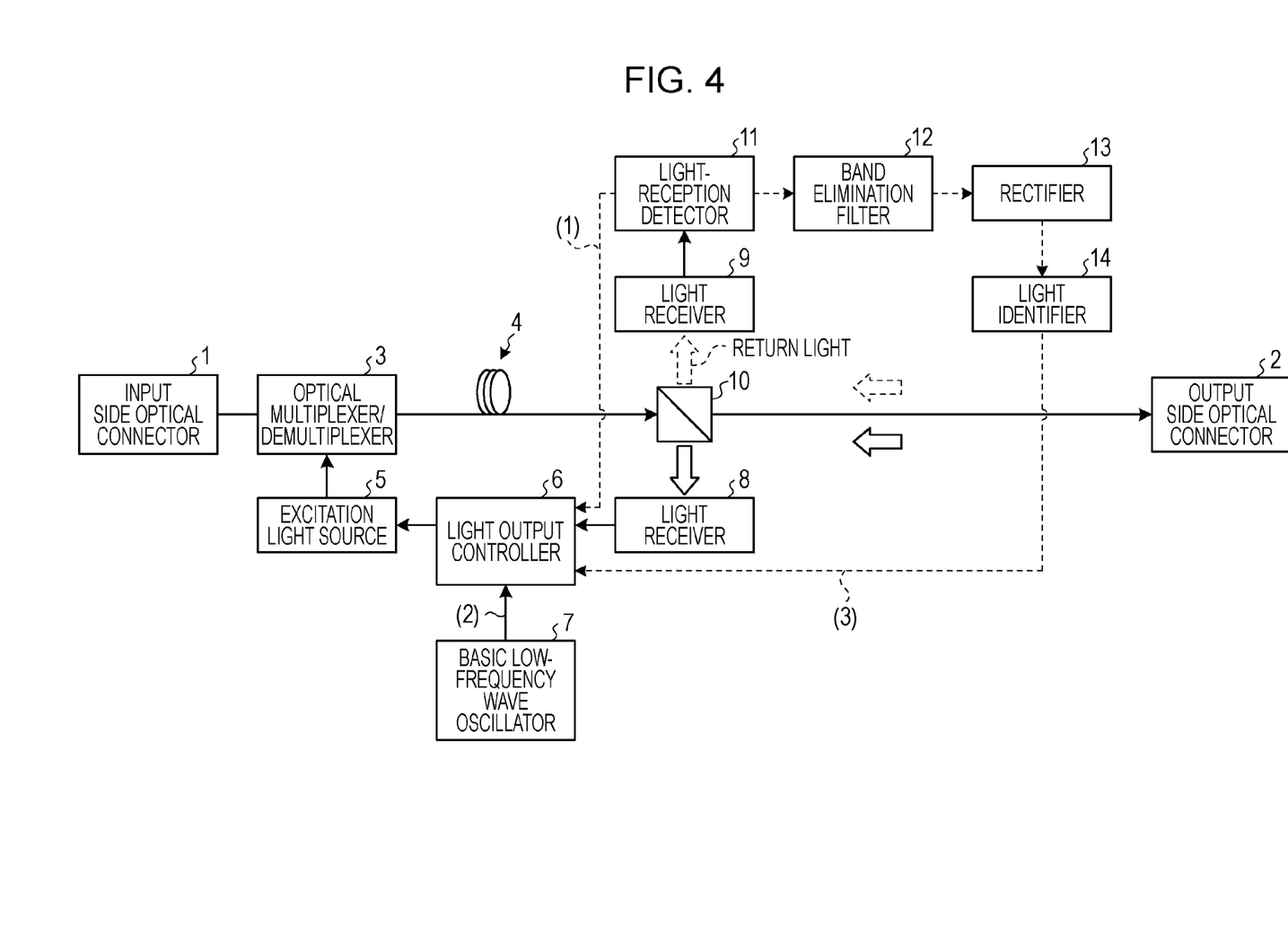
FIG. 4 is a view illustrating a configuration and a processing in the optical transmission device according to the first embodiment of the present invention.

A configuration and a processing in the optical transmission device according to the first embodiment will be described with reference to FIG. 4. FIG. 4 is a view illustrating a configuration and a processing in the optical transmission device according to the first embodiment of the present invention.

The optical transmission device according to the first embodiment includes an input side optical connector 1, an output side optical connector 2, an optical multiplexer/demultiplexer 3, an erbium doped fiber (EDF) 4, an excitation light source 5, a light output controller 6, a basic low-frequency wave oscillator 7, a light receiver 8, a light receiver 9, a mirror 10, a light-reception detector 11, a band elimination filter 12, a rectifier 13, and a light identifier 14.

The input side optical connector 1 and the output side optical connector 2 connect an optical fiber for transmitting an optical signal to the outside. The optical multiplexer/demultiplexer 3 multiplexes or separates input light and outputs the light. The optical multiplexer/demultiplexer 3 generates signal light by multiplexing excitation light generated in the excitation light source 5 and input signal light externally inputted via the input side optical connector 1. That is, the optical multiplexer/demultiplexer 3, in a case where superimposed light having a superimposed basic low-frequency wave is outputted from the excitation light source 5, multiplexes the superimposed light and the input signal light and outputs the light to the EDF 4.

The EDF 4 is an amplifier that inputs the signal light having the superimposed excitation light generated in the optical multiplexer/demultiplexer 3, generates a population inversion and amplifies the light. The excitation light source 5 is a light source that generates excitation light to be multiplexed with the input signal light and may be, for example, a semiconductor laser.

The light output controller 6 controls the excitation light generated in the excitation light source 5, and controls the excitation light source 5 such that the excitation light source 5 superimposes the basic low-frequency wave generated in the basic low-frequency wave oscillator 7 and the excitation light. Furthermore, the light output controller 6 receives an input of an identification result from the light identifier 14, and if the identification result indicates that light is the Fresnel light caused by a disconnection of the optical connector, controls to reduce the light output from the excitation light source 5 to a safe level, and transmits a warning by an alarm indicating the optical connector disconnection to the administrator. If the identification result indicates that the light is the Stokes light caused by SBS, the light output controller 6 transmits a warning by an alarm indicating the SBS to the administrator.

The basic low-frequency wave oscillator 7 generates a basic low-frequency wave. The light receiver 8 receives signal light to be outputted to the outside and transmits the light to the light output controller 6 for the output control of excitation light in the light output controller 6. The light receiver 9 receives return light returned from the output side optical connector 2 and inputs the light into the light-reception detector 11. The mirror 10 has a function to transmit incident light at a certain rate and reflect the light that is not transmitted. The mirror 10 changes an incident path of signal light to be outputted to the outside and inputs the light into the light receiver 8, and also changes an incident path of return light returned from the outside and inputs the light into the light receiver 9. The light-reception detector 11 receives the input of the return light from the light receiver 9 and inputs a signal indicating a detection of the return light into the light output controller 6. The light-reception detector 11 also receives return superimposed light having a superimposed basic low-frequency wave from the light receiver 9 and outputs the light to the band elimination filter 12.

The band elimination filter 12 is a filter for obtaining a frequency component by removing the basic low-frequency wave from a frequency band of the return superimposed light inputted from the light-reception detector 11. The rectifier 13 performs a peak-to-peak rectification with respect to the frequency component obtained by removing the basic low-frequency wave by the band elimination filter 12.

The light identifier 14, based on the frequency component rectified by the rectifier 13, identifies whether the return light detected by the light-reception detector 11 is the Fresnel light caused by a disconnection of the optical connector or the Stokes light caused by SBS.

Specifically, if the frequency component rectified by the rectifier 13 has a low frequency level in each frequency band (FIG. 2B), the light identifier 14 identifies the return light detected by the light-reception detector 11 as the Fresnel light caused by a disconnection of the optical connector. If the frequency component rectified by the rectifier 13 has high frequency levels in frequency bands lower than the basic low-frequency wave (FIG. 3B), the light identifier 14 identifies the return light detected by the light-reception detector 11 as the Stokes light caused by SBS.

Subsequently, the light identifier 14 outputs the identification result to the light output controller 6.

Now, a processing performed by the optical transmission device according to the first embodiment is described. The light output controller 6 receives an input of a signal indicating a detection of return light from the light-reception detector 11 ((1) in FIG. 4), controls the excitation light source 5 to superimpose the basic low-frequency wave generated in the basic low-frequency wave oscillator 7 and the excitation light ((2) in FIG. 4), and outputs the superimposed light having the superimposed basic low-frequency wave to the output side optical connector 2.

The light-reception detector 11 receives the superimposed light having the superimposed basic low-frequency wave from the light receiver 9 and outputs the light to the band elimination filter 12. The band elimination filter 12 acquires the frequency component by removing the basic low-frequency wave from the return superimposed light inputted from the light-reception detector 11 and outputs the frequency component to the rectifier 13. The rectifier 13 performs the peak-to-peak rectification with respect to the frequency component obtained by removing the basic low-frequency wave by the band elimination filter 12.

The light identifier 14, based on the frequency component rectified by the rectifier 13, identifies whether the return light detected by the light-reception detector 11 is the Fresnel light caused by a disconnection of the optical connector or the Stokes light caused by SBS, and outputs the identification result to the light output controller 6 ((3) in FIG. 4).

Specifically, if the frequency component rectified by the rectifier 13 has a low frequency level in each frequency band, the light identifier 14 identifies the return light detected by the light-reception detector 11 as the Fresnel light caused by a disconnection of the optical connector. If the frequency component rectified by the rectifier 13 has high frequency levels in frequency bands lower than the basic low-frequency wave, the light identifier 14 identifies the return light detected by the light-reception detector 11 as the Stokes light caused by SBS. Then, the light identifier 14 outputs the identification result to the light output controller 6.

Effects in the First Embodiment

As described above, in the first embodiment, the frequency component obtained by removing the frequency component of the basic low-frequency wave from the frequency band of the return superimposed light is acquired and integrated. If the integration result (amplitude) exceeds a threshold, the return light detected by the light-reception detector 11 is identified as the Stokes light caused by SBS. If the integration result does not exceed the threshold, the return light detected by the light-reception detector 11 is identified as the Fresnel light caused by a disconnection of the optical connector. Accordingly, it is possible to evaluate whether a component other than the basic low-frequency wave component exists or not by removing the basic low-frequency wave from the return superimposed light having the superimposed basic low-frequency wave. Further, it is possible to identify the return light as the Fresnel light caused by a disconnection of the optical connector or the Stokes light caused by SBS. Furthermore, it is possible to identify reflected light detected in the system as light caused by an optical connector disconnection or light caused by SBS.

Second Embodiment

In the above-described first embodiment, the return light returned from the output side optical connector is identified by acquiring a frequency component by removing the frequency component of the basic low-frequency wave from the frequency band of return superimposed light has been described. However, the present invention is not limited to the above. The return light returned from the output side optical connector may be identified by acquiring a temporal variation in a waveform of the return superimposed light and using the variation. In a second embodiment, an outline and characteristics of an optical transmission device according to the second embodiment, a configuration and a processing in the optical transmission device are described in the order, and effects according to the second embodiment will be described.

Outline and Characteristics of Optical Transmission Device (Second Embodiment)

Figure 5:
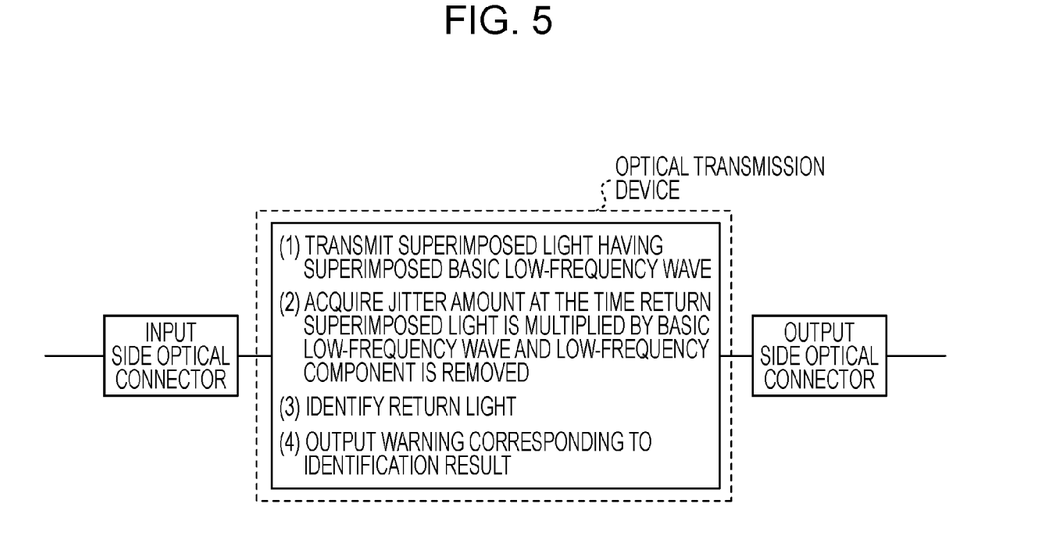
FIG. 5 is a view illustrating an outline and characteristics of an optical transmission device according to a second embodiment of the present invention.
Figure 6A:
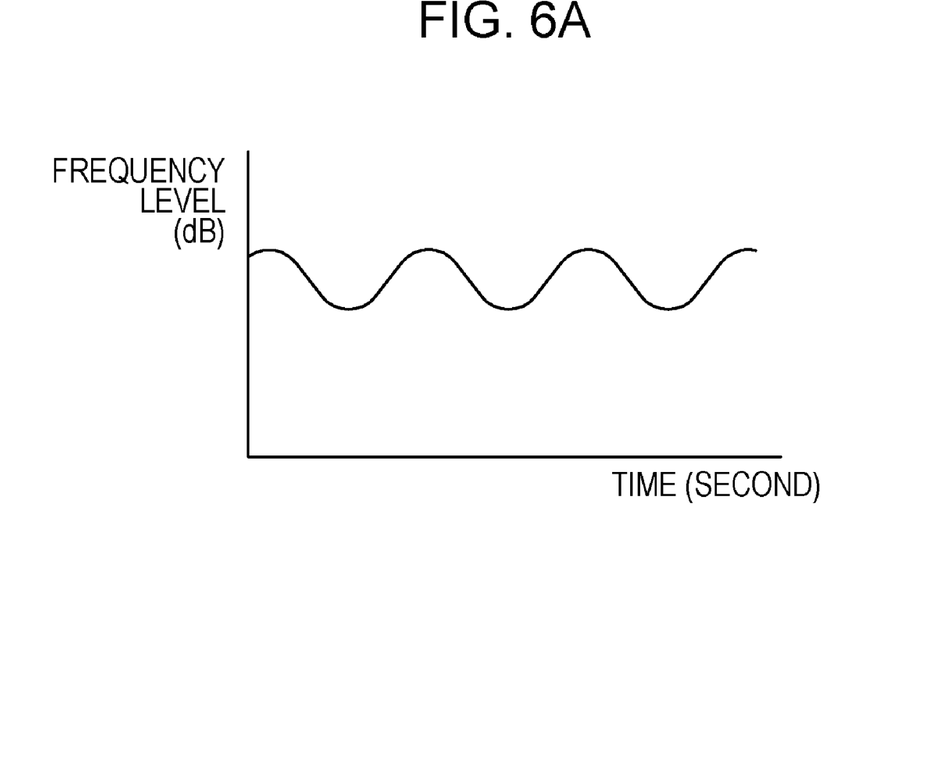
FIGS. 6A and 6B are schematic diagrams illustrating characteristics of Fresnel light according to the second embodiment of the present invention.
Figure 6B:
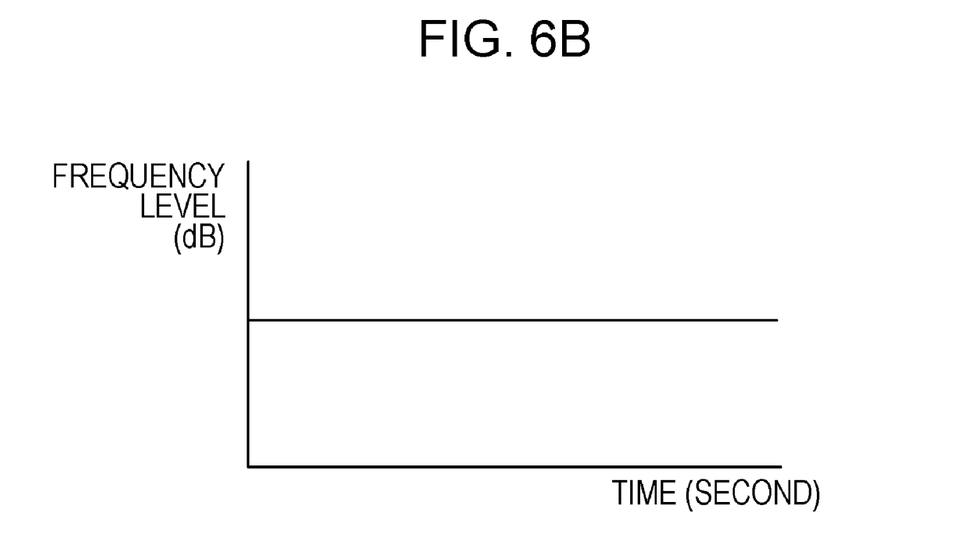
Figure 7A:
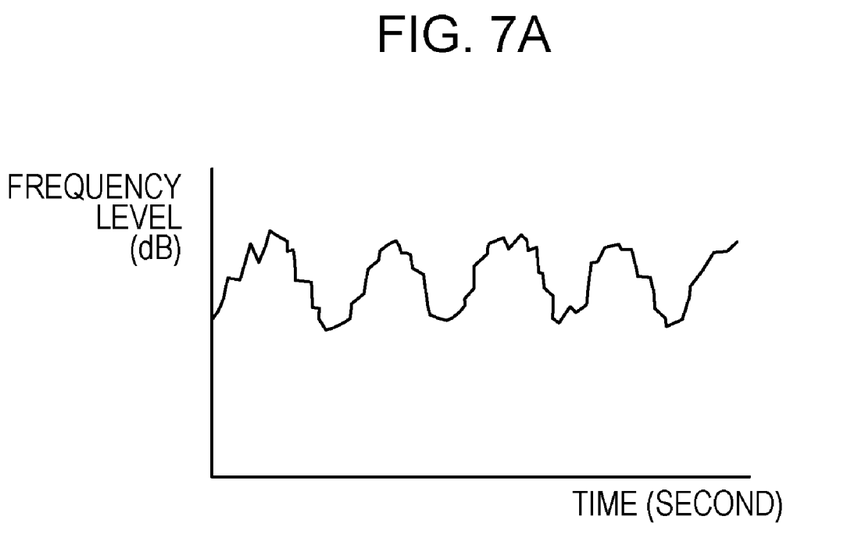
FIGS. 7A and 7B are schematic diagrams illustrating characteristics of Stokes light according to the second embodiment of the present invention.
Figure 7B:
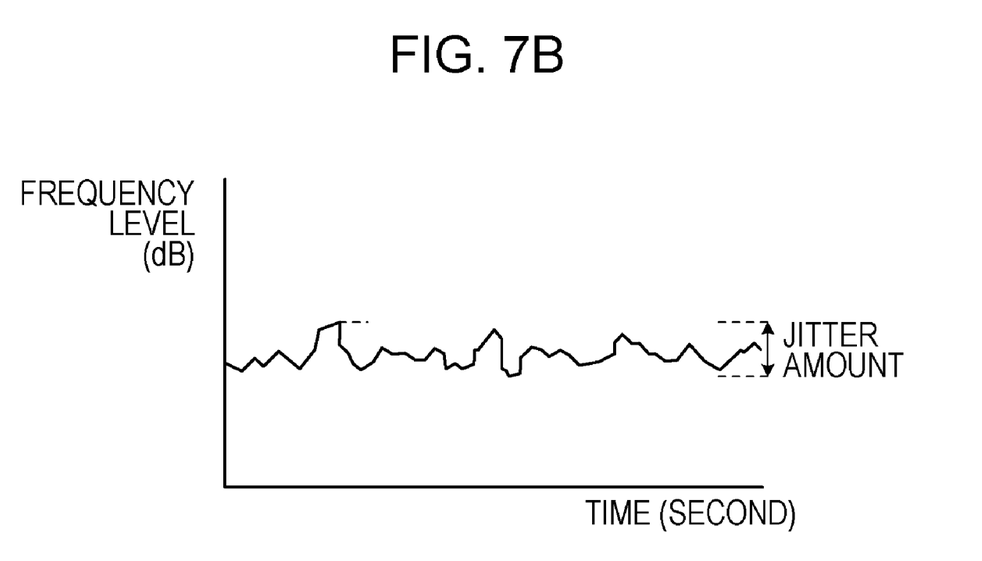

First, with reference to FIGS. 5 to 7, an outline and characteristics of an optical transmission device according to the second embodiment will be described. FIG. 5 is a view illustrating an outline and characteristics of an optical transmission device according to the second embodiment of the present invention. FIGS. 6A and 6B are schematic diagrams illustrating characteristics of Fresnel light caused by a disconnection of an optical connector according to the second embodiment of the present invention. FIGS. 7A and 7B are schematic diagrams illustrating characteristics of Stokes light caused by SBS according to the second embodiment of the present invention.

The optical transmission device according to the second embodiment has, similarly to the above-described first embodiment, a primary characteristic that the optical transmission device can identify whether reflected light detected in the system is caused by an optical connector disconnection or SBS. However, in realizing the characteristic, the optical transmission device according to the second embodiment differs from that in the first embodiment as described below.

That is, the optical transmission device according to the second embodiment further multiplies the return superimposed light returned from the output side optical connector by the basic low-frequency wave, acquires a variation (hereinafter referred to as jitter amount) in a temporal waveform at the time a low-frequency component is removed ((2) in FIG. 5), and identifies the return light returned from the output side optical connector as Fresnel light caused by a disconnection of the optical connector or Stokes light caused by SBS ((3) in FIG. 5).

Now, characteristics of the Fresnel light and the Stokes light at the time the return superimposed light is multiplied by the basic low-frequency wave and the low-frequency component is removed are briefly described. First, if the return light returned from the output side optical connector is the Fresnel light caused by a disconnection of the optical connector, a relationship between a frequency level of the superimposed light generated by superimposing the return light and the basic low-frequency wave and time becomes a relationship illustrated in FIG. 6A. In a case where the return superimposed light returned from the output side optical connector is multiplied by the basic low-frequency wave and the low-frequency component is removed, as illustrated in FIG. 6B, no temporal change is observed, and the frequency level has a substantially constant value.

On the other hand, if the return light returned from the output side optical connector is the Stokes light caused by SBS, a relationship between the frequency level of the superimposed light generated by superimposing the return light and the basic low-frequency wave and time becomes a relationship illustrated in FIG. 7A. In this case, different from the case of the Fresnel light, the waveform has complicated fluctuations. In a case where the return superimposed light returned from the output side optical connector is multiplied by the basic low-frequency wave and the low-frequency component is removed, as illustrated in FIG. 7B, the temporal waveform has irregular changes (changes in the phase and amplitude).

The optical transmission device according to the second embodiment, as a result of an analysis of the return superimposed light returned from the output side optical connector, as illustrated in FIG. 6B, if there is no temporal change and it is not possible to acquire a jitter amount though the acquisition of the jitter amount is attempted, or an acquired jitter amount does not exceed a threshold, the optical transmission device identifies the return light returned from the output side optical connector as the Fresnel light caused by a disconnection of the optical connector.

Furthermore, the optical transmission device according to the second embodiment, as a result of the analysis of the return superimposed light returned from the output side optical connector, as illustrated in FIG. 7B, if the temporal waveform has irregular changes (changes in the phase and amplitude), and it is possible to acquire a jitter amount corresponding to the irregular changes, the optical transmission device acquires the jitter amount. Further, if the acquired jitter amount exceeds the threshold, the optical transmission device identifies the return light returned from the output side optical connector as the Stokes light caused by SBS.

With the processings, similarly to the above-described first embodiment, the optical transmission device according to the second embodiment can identify whether the reflected light detected in the system is caused by a optical connection disconnection or SBS.

Configuration and Processing in Optical Transmission Device (Second Embodiment)

Figure 8:
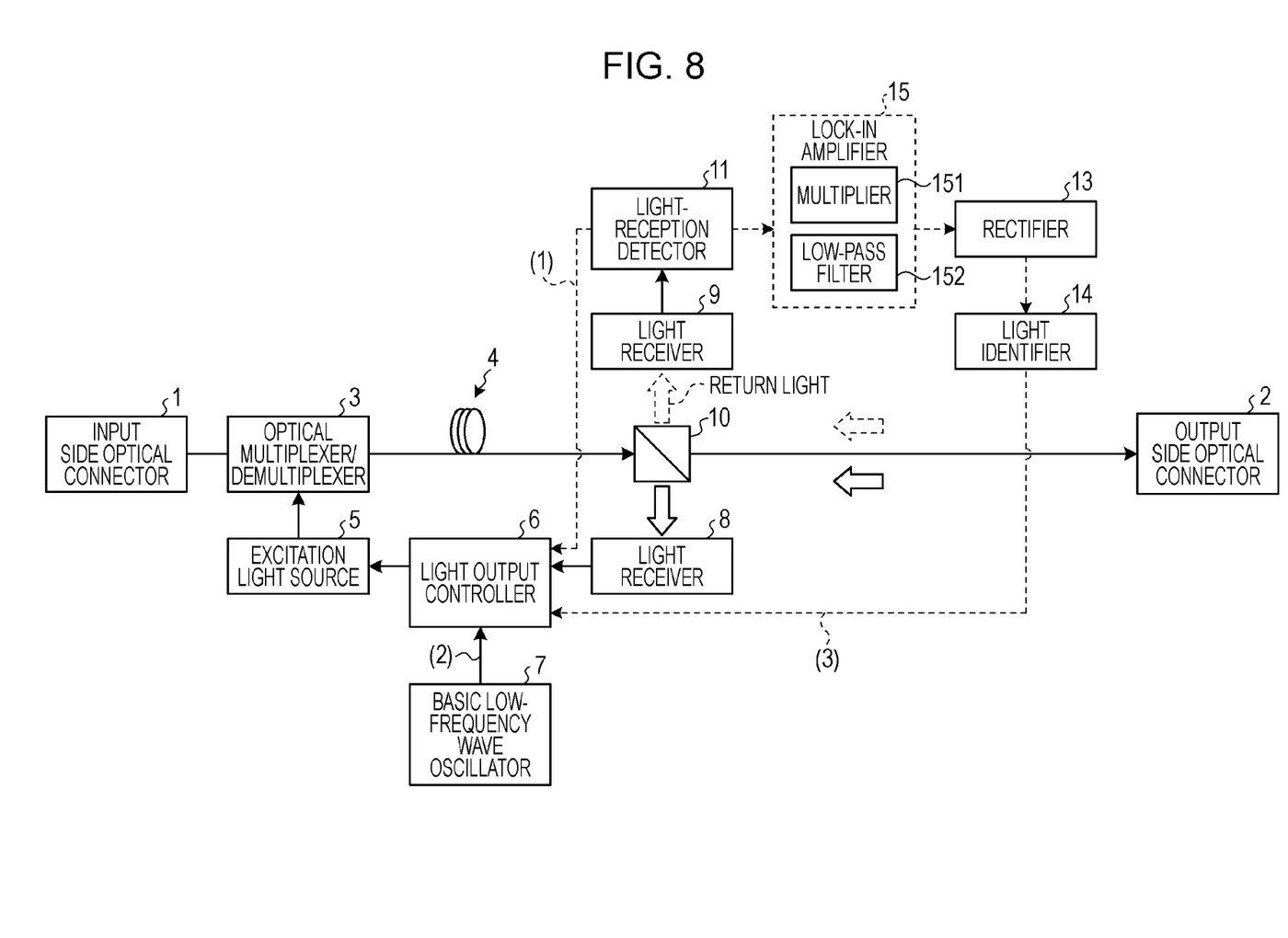
FIG. 8 is a view illustrating a configuration and a processing in the optical transmission device according to the second embodiment of the present invention.
Figure 9:
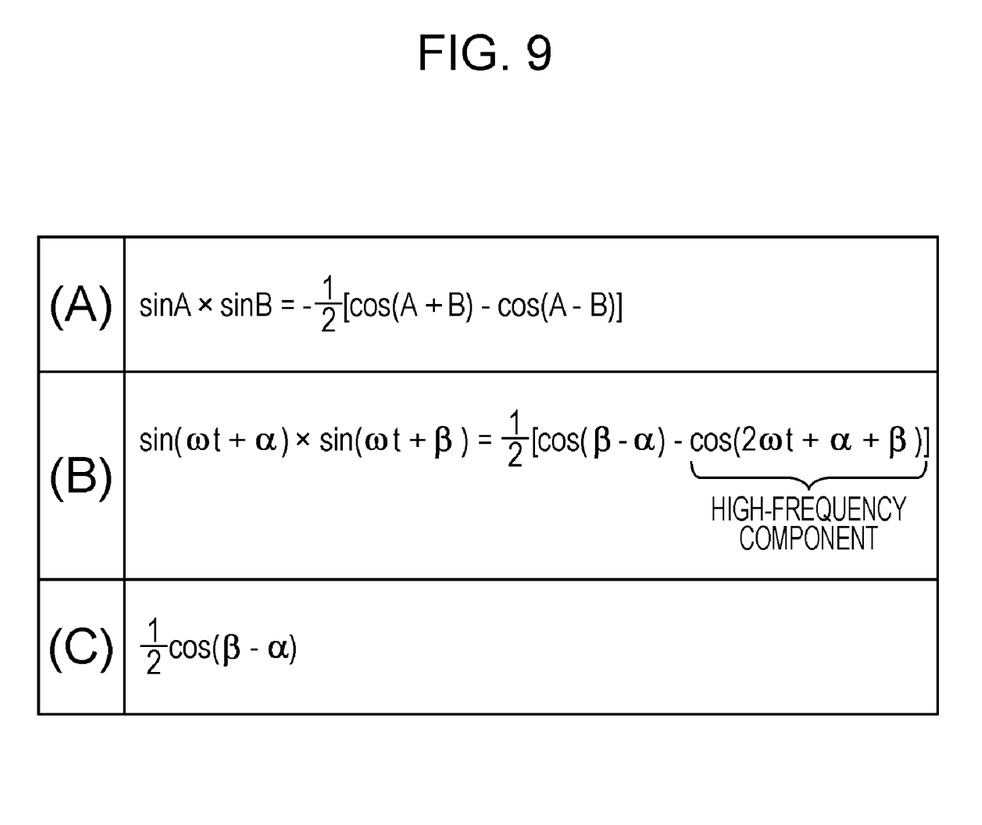
FIG. 9 is a view illustrating mathematical expressions for explaining a principle of a lock-in amplifier according to the second embodiment of the present invention.

A configuration and a processing in the optical transmission device according to the second embodiment will be described with reference to FIGS. 8 and 9. FIG. 8 is a view illustrating a configuration and a processing in the optical transmission device according to the second embodiment of the present invention. FIG. 9 is a view illustrating a principle of a lock-in amplifier according to the second embodiment of the present invention. The optical transmission device according to the second embodiment differs from that in the first embodiment as described below.

That is, the optical transmission device according to the second embodiment has a lock-in amplifier 15 in place of the band elimination filter 12.

The lock-in amplifier 15 analyzes return superimposed light inputted from the light-reception detector 11, and outputs a result to the light identifier 14. The lock-in amplifier 15 includes a multiplier 151 and a low-pass filter 152.

The multiplier 151 multiplies, by the basic low-frequency wave, the return superimposed light inputted from the light-reception detector 11 and outputs the return superimposed light multiplied by the basic low-frequency wave to the low-pass filter 152. The low-pass filter 152 removes a low-frequency component from the return superimposed light multiplied by the basic low-frequency wave, and outputs the resulting light to the light identifier 14 as an analysis result of the superimposed light.

Now, with respect to Fresnel light and Stokes light at the time the return superimposed light is multiplied by the basic low-frequency wave and the low-frequency component is removed, a processing performed in the multiplier 151 and the low-pass filter 152 is described.

In a case where the return light returned from the output side optical connector is the Fresnel light caused by a disconnection of the optical connector, a relationship between a frequency level of the superimposed light generated by superimposing the return light and the basic low-frequency wave and time becomes the relationship illustrated in FIG. 6A. Furthermore, if the superimposed light inputted from the light-reception detector 11 is multiplied by the basic low-frequency wave by the multiplier, and a product-sum formula of a trigonometric function expressed as a formula (A) is used, the relationship can be expressed, for example, by an expression (B) in FIG. 9. Furthermore, using the low-pass filter, a term indicating a high-frequency component (component that changes with time) in the expression (B) in FIG. 9 is removed. As a result, as expressed in an expression (C) in FIG. 9, the frequency level has a substantially constant value that does not change with time.

On the other hand, in a case where the return light returned from the output side optical connector is the Stokes light caused by SBS, a relationship between a frequency level of the superimposed light generated by superimposing the return light and the basic low-frequency wave and time becomes a relationship illustrated in FIG. 7A. In the relationship, different from the case of the Fresnel light, the waveform has complicated fluctuations. Accordingly, if the term indicating the high-frequency component (component that changes with time) in the expression (B) in FIG. 9 is removed, the complicated fluctuations generated in the waveform are not removed, and the temporal waveform has irregular changes (changes in the phase and amplitude).

The light identifier 14 receives the input of the analysis result from the lock-in amplifier 15, and identifies the return light detected by the light-reception detector 11 as the Fresnel light caused by a disconnection of the optical connector or the Stokes light caused by SBS.

Specifically, as illustrated in FIG. 6B, if there is no temporal change and it is not possible to acquire a jitter amount though the acquisition of the jitter amount is attempted, or an acquired jitter amount does not exceed the threshold, the light identifier 14 identifies the return light detected by the light-reception detector 11 as the Fresnel light caused by a disconnection of the optical connector.

On the other hand, as illustrated in FIG. 7B, if the temporal waveform has irregular changes (changes in the phase and amplitude) and a jitter amount corresponding to the irregular changes can be acquired, the light identifier 14 acquires the jitter amount. Further, if the acquired jitter amount exceeds the threshold, the light identifier 14 identifies the return light detected by the light-reception detector 11 as the Stokes light caused by SBS.

Subsequently, a processing performed by the optical transmission device according to the second embodiment is described. Similarly to the above-described first embodiment, in response to the input of the signal indicating the detection of the return light from the light-reception detector 11 ((1) in FIG. 8), the light output controller 6 controls the excitation light source 5 such that the excitation light is superimposed with the basic low-frequency wave generated by the basic low-frequency wave oscillator 7 ((2) in FIG. 8). Then, the light output controller 6 outputs the superimposed light having the superimposed basic low-frequency wave to the output side optical connector 2.

The light-reception detector 11 receives the return superimposed light having the superimposed basic low-frequency wave from the light receiver 9, and outputs the superimposed light to the lock-in amplifier 15. The lock-in amplifier 15, using the multiplier 151, multiplies the return superimposed light inputted from the light-reception detector 11 by the basic low-frequency wave and, using the low-pass filter 152, removes a low-frequency component from the return superimposed light having the multiplied basic low-frequency wave, and outputs to the light identifier 14 as an analysis result of the superimposed light.

The light identifier 14 receives the analysis result from the lock-in amplifier 15, and identifies the return light detected by the light-reception detector 11 as the Fresnel light caused by a disconnection of the optical connector or the Stokes light caused by SBS.

Specifically, if there is no temporal change in the superimposed light from which the low-frequency component is removed, the light is inputted from the lock-in amplifier 15, and it is not possible to acquire a jitter amount though the acquisition of the jitter amount is attempted (FIG. 6B), the light identifier 14 identifies the return light detected by the light-reception detector 11 as Fresnel light caused by a disconnection of the optical connector.

On the other hand, if the superimposed light from which the low-frequency component is removed, which is inputted from the lock-in amplifier 15, has temporal irregular changes (changes in the phase and amplitude) and a jitter amount corresponding to the irregular changes can be acquired (FIG. 7B), the light identifier 14 acquires the jitter amount. Furthermore, if the acquired jitter amount exceeds the threshold, the light identifier 14 identifies the return light detected by the light-reception detector 11 as the Stokes light caused by SBS.

Effects in the Second Embodiment

As described above, in the second embodiment, it is possible to acquire a jitter amount that is a temporal variation in a waveform for evaluating a phase and an amplitude of the optical signal waveform from return superimposed light with respect to superimposed light, and identify the light as Fresnel light caused by a disconnection of the optical connector or Stokes light caused by SBS. Accordingly, it is possible to identify whether reflected light detected in the system is caused by an optical connector disconnection or SBS.

Third Embodiment

So far, embodiments of the present invention have been described. However, other than the above-described embodiments, the present invention can be realized by various different embodiments. Hereinafter, the other embodiments of the present invention will be described.

a. Device Configuration, Etc.

Each configurational element in the optical transmission device illustrated in FIG. 4 or FIG. 8 has been described as a functional concept, and it is not always necessary to physically configure the elements as illustrated in the drawings. That is, specific embodiments of distribution and integration of the optical transmission device are not limited to the illustrated examples. For example, the light output controller 6 and the basic low-frequency wave oscillator 7 can be integrally formed, and a part or all of the elements of the optical transmission device can be functionally or physically distributed or integrated in any unit depending on various loads or statuses of use. Furthermore, each processing function (see FIG. 4 and FIG. 8) performed in the optical transmission device can be realized as hardware using a wired logic.

(2) Optical Transmission Method

Furthermore, using the optical transmission device described in the above embodiments, an optical transmission method described below can be realized.

That is, in an optical transmission device for controlling an optical signal output and transmitting an optical signal via an optical transmission line having an optical fiber connected by an optical connector, an optical transmission method that includes the following steps is implemented. The optical transmission method includes a return light detection step for detecting return light of the optical signal transmitted via the optical transmission line (for example, (1) in FIG. 4), a superimposed light transmission step for generating superimposed light having a superimposed basic low-frequency wave and transmitting the light if return light is detected in the return light detection step (for example, (2) in FIG. 4), a return light identification step for identifying the return light detected in the return light detection step as Fresnel light caused by a disconnection of the optical connector or as Stokes light caused by stimulated Brillouin scattering (SBS) based on an analysis result of the return superimposed light with respect to the superimposed light transmitted in the superimposed light transmission step (for example, (3) in FIG. 4), and a warning output step for outputting a warning in a state the identification result in the return light identification section can be distinguished.

What is claimed is:

1. An optical transmission device for controlling an optical signal output and transmitting an optical signal via an optical transmission line having an optical fiber connected by an optical connector, the optical transmission device comprising:

an optical detector to detect return light of the optical signal transmitted via the optical transmission line;

an optical transmitter to generate superimposed light having a superimposed basic low-frequency wave and transmitting the light when return light is detected by the optical detector;

a return light identification section to identify the return light detected by the optical detector as Fresnel light caused by a disconnection of the optical connector or Stokes light caused by stimulated Brillouin scattering based on an analysis result of the return superimposed light with respect to the superimposed light transmitted by the optical transmitter; and a jitter amount acquisition section to multiply a frequency of the return superimposed light with respect to the superimposed light transmitted from the optical transmitter by a frequency of the superimposed basic low-frequency wave, removing a low-frequency band from a frequency band of the multiplied frequency, and acquiring a jitter amount that is a variation in a temporal waveform, wherein the return light identification section identifies the return light detected by the optical detector as the Stokes light when the jitter amount acquired by the jitter amount acquisition section exceeds a threshold, and identifies the return light detected by the optical detector as the Fresnel light when the jitter amount acquired by the jitter amount acquisition section does not exceed the threshold.

2. The optical transmission device according to claim 1, further comprising:

a frequency component acquisition section to acquire a frequency component by removing a frequency component of the superimposed basic low-frequency wave from the frequency band of the return superimposed light with respect to the superimposed light transmitted by the optical transmitter, wherein the return light identification section integrates the frequency component acquired by the frequency component acquisition section, and identifies the return light detected by the optical detector as the Stokes light when the integration result exceeds a threshold, and identifies the return light detected by the optical detector as the Fresnel light when the integration result does not exceed the threshold.

3. An optical transmission method for controlling an optical signal output and transmitting an optical signal via an optical transmission line having an optical fiber coupled by an optical connector, the optical transmission method comprising:

detecting return light of the optical signal transmitted via the optical transmission line;

generating superimposed light having a superimposed basic low-frequency wave and transmitting the light when return light is detected;

identifying the detected return light as Fresnel light caused by a decoupling of the optical connector or Stokes light caused by stimulated Brillouin scattering based on an analysis result of the return superimposed light with respect to the transmitted superimposed light; and multiplying a frequency of the return superimposed light with respect to the transmitted superimposed light by a frequency of the superimposed basic low-frequency wave, removing a low-frequency band from a frequency band of the multiplied frequency, and acquiring a jitter amount that is a variation in a temporal waveform, wherein, identifying the detected return light includes indentifying the detected return light as the Stokes light when the acquired jitter amount exceeds a threshold, and indentifying the detected return light as the Fresnel light when the acquired jitter amount does not exceed the threshold.

4. The optical transmission method according to claim 3, further comprising:

acquiring a frequency component by removing a frequency component of the superimposed basic low-frequency wave from the frequency band of the return superimposed light with respect to the transmitted superimposed light, wherein indentifying the detected return light includes indentifying the acquired frequency component, and identifies the return light as the Stokes light when the integration result exceeds a threshold, and identifying the return light as the Fresnel light when the integration result does not exceed the threshold.

* * * * *